United States Patent
Fisher et al.

(10) Patent No.: US 9,928,166 B2
(45) Date of Patent: Mar. 27, 2018

(54) DETECTING HOT SPOTS THROUGH FLASH MEMORY MANAGEMENT TABLE SNAPSHOTS

(71) Applicant: International Business Machines Corporation, Armonk, NY (US)

(72) Inventors: Timothy J. Fisher, Cypress, TX (US); Aaron D. Fry, Richmond, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 14/139,933

(22) Filed: Dec. 24, 2013

(65) Prior Publication Data

US 2015/0178190 A1    Jun. 25, 2015

(51) Int. Cl.
    *G06F 12/00* (2006.01)
    *G06F 12/02* (2006.01)
    *G06F 3/06* (2006.01)
    *G06F 12/08* (2016.01)

(52) U.S. Cl.
    CPC .......... *G06F 12/0246* (2013.01); *G06F 3/061* (2013.01); *G06F 3/0604* (2013.01); *G06F 3/0616* (2013.01); *G06F 3/0628* (2013.01); *G06F 3/0649* (2013.01); *G06F 3/0653* (2013.01); *G06F 3/0662* (2013.01); *G06F 3/0665* (2013.01); *G06F 3/0679* (2013.01); *G06F 12/00* (2013.01); *G06F 12/0238* (2013.01); *G06F 12/08* (2013.01)

(58) Field of Classification Search
    None
    See application file for complete search history.

(56) References Cited

U.S. PATENT DOCUMENTS

| | | | |
|---|---|---|---|
| 7,650,480 | B2 | 1/2010 | Jiang |
| 7,949,637 | B1 | 5/2011 | Burke |
| 8,452,929 | B2 | 5/2013 | Bennett |
| 2009/0138654 | A1 | 5/2009 | Sutardja |
| 2010/0070735 | A1 | 3/2010 | Chen et al. |
| 2012/0166749 | A1 | 6/2012 | Eleftheriou et al. |
| 2012/0297122 | A1 | 11/2012 | Gorobets et al. |

OTHER PUBLICATIONS

Chiang et al., "A New FTL-based Flash Memory Management Scheme with Fast Cleaning Mechanism," The 2008 International Conference on Embedded Software and Systems (ICESS2008), IEEE Computer Society, pp. 205-214, 2008.

*Primary Examiner* — Midys Rojas
(74) *Attorney, Agent, or Firm* — Andrew Aubert; David B. Woycechowsky

(57) ABSTRACT

Decisions about how to correlate logical address to physical addresses in a flash memory (or other non-volatile random access memory) is based at least in part upon how frequently a logical address is accessed over time. Accordingly, software tracks accesses, by logical address, to the stored data using a flash memory metadata structure, and calculates a frequency-of-access value for each logical address of the set of logical addresses corresponding to the relative frequency with which the corresponding logical address is accessed, based, at least in part, on the flash memory metadata structure. For example, logical addresses with low frequency may be grouped together so that the frequency of erasure operations (which are often done on a block by block basis) will tend to be reduced.

12 Claims, 3 Drawing Sheets

FLASH MGM'T PROGRAM, 300

INITIAL WRITE MOD, 355

SNAPSHOT MOD, 362

ERASE BLOCK MOD, 370

NORMAL OPS MOD, 360

CALCULATE HEAT MOD, 363

FLASH MANAGEMENT TABLES MOD, 361

ARRANGE PAGES MOD, 365

| BLOCK 1 | | BLOCK 2 | |
|---|---|---|---|
| PAGE A | PAGE B | PAGE E | PAGE F |
| b (HEAT = 9) | g (HEAT = 8) | c (HEAT = 4) | d (HEAT = 5) |
| PAGE C | PAGE D | PAGE G | PAGE H |
| h (HEAT = 7) | | | |
| BLOCK3 | | BLOCK 4 | |
| PAGE I | PAGE J | PAGE M | PAGE N |
| | | a (HEAT = 1) | e (HEAT = 2) |
| PAGE K | PAGE L | PAGE O | PAGE P |
| | | f (HEAT = 2) | |

| BLOCK 1 | | BLOCK 2 | |
|---|---|---|---|
| PAGE A | PAGE B | PAGE E | PAGE F |
| | | c (HEAT = 4) | d (HEAT = 5) |
| PAGE C | PAGE D | PAGE G | PAGE H |
| | | | |
| BLOCK3 | | BLOCK 4 | |
| PAGE I | PAGE J | PAGE M | PAGE N |
| b (HEAT = 9) | h (HEAT = 7) | a (HEAT = 1) | e (HEAT = 2) |
| PAGE K | PAGE L | PAGE O | PAGE P |
| | | f (HEAT = 2) | |

DETECTING HOT SPOTS THROUGH FLASH MEMORY MANAGEMENT TABLE SNAPSHOTS

FIELD OF THE INVENTION

The present invention relates generally to the field of machine readable data storage, and more particularly to the field of flash memory data storage.

BACKGROUND OF THE INVENTION

Non-volatile random access memory ("NVRAM," see definition of NVRAM, below) is an electronic, non-volatile machine readable storage medium that can be electrically erased and rewritten. One type of NVRAM is flash memory. Two main types of flash memory are: (i) NAND logic gate type; and (ii) NOR logic gate type. NAND type flash memory may be written and read in blocks (or pages), which are generally much smaller than the entire device. The NOR type allows a single machine word (byte) to be written or read independently.

Flash memory management (and other NVRAM management) will often associate a single logical block address to many different physical addresses. More specifically, as the host issues updated writes for a particular logical address, the old physical address is invalidated and a new physical address is now associated with the logical address. This helps to maintain a high level of throughput. A single physical block includes portions of data that will respectively correspond to many different logical addresses. Physical blocks will often, over time, come to consist of both of the following: (i) old, invalid data; and (ii) currently valid (also called "new") data.

In some conventional NVRAM memory systems, data is written to physical memory at a granularity level that is different from the granularity level at which data is erased from the physical memory. In currently conventional flash memories, erases are performed on a block by block basis, while programs (or "writes") are performed on a page by page basis. Due to this granularity difference, when a block has been subject to data erasure (herein referred to as an "erased block") data must be relocated from the erased block to another block in order to avoid losing data that is still current and not meant to be erased. This "garbage collection" process is necessary to reclaim blocks for new incoming writes. This is conventionally done solely considering validity. Valid pages will be relocated to a new block and paired with more valid pages from other blocks. The number of pages within a block will vary across different flash memory devices. This method makes the assumption that the valid pages being relocated are "colder" data. "Cold" data is that which is rarely overwritten, while "hot" data is that which is overwritten frequently.

SUMMARY

According to an aspect of the present invention, there is a method, system and/or computer program product for providing information regarding NVRAM data access. The method including the following steps (not necessarily in the following order): (i) storing data in an NVRAM memory with the data being arranged according to a set of logical addresses which are respectively stored at a set of physical addresses corresponding to a hardware layout of the NVRAM; (ii) tracking accesses, by logical address, to the stored data using an NVRAM metadata structure; and (iii) calculating a frequency-of-access value for each logical address of the set of logical addresses corresponding to the relative frequency with which the corresponding logical address is accessed, based, at least in part, on the NVRAM metadata structure.

BRIEF DESCRIPTION OF THE SEVERAL VIEWS OF THE DRAWINGS

FIG. 4 is a memory diagram of a flash memory used in the first embodiment computer system; and FIG. 5 is another memory diagram of the flash memory used in the first embodiment computer system.

DETAILED DESCRIPTION

Figure 1:
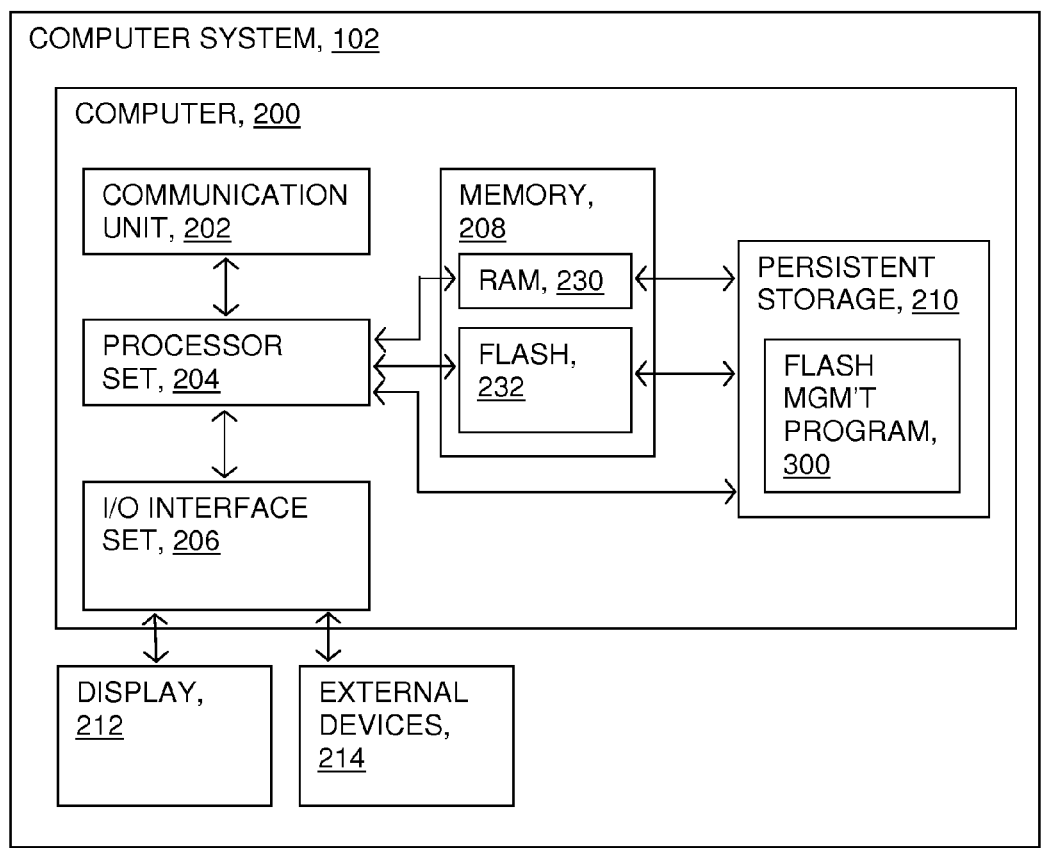
FIG. 1 is a schematic view of a first embodiment of a computer system according to the present invention.

Some embodiments of the present invention involve assigning and updating "heat values" to logical memory locations corresponding to a flash memory, and using the heat values to control how the flash memory is managed, such as the way in which physical memory address are chosen to correspond to logical memory addresses. In some embodiments of the present invention, a heat level of logical address spaces is determined based, at least in part, upon snapshot comparison. In some embodiments: (i) snapshots alone are used to maintain up-to-date persistent flash mapping and metadata tables (as will be discussed in more detail, below); and (ii) logical to physical tables are used to map logical storage to physical storage. These embodiments may be designed to take advantage of these pre-existing mapping and snapshotting operations, and leverage the information that these mapping and snapshotting operations provide in order to generate pattern information, which can then be effectively translated into a heat value. The heat value, once obtained, can improve performance, efficiency, health, and/or other vital flash management functions.

While the embodiments discussed in this Detailed description section will generally be drawn to flash memory medium example, the present invention may be more generally applicable to any type of NVRAM, or to any type of NVRAM that performs snapshotting.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the FIG. 1, which shows computer system 102, including: computer 200; communication unit 202; processor set 204; input/output (i/o) interface set 206; memory device 208; persistent storage device 210; display device 212; external device set 214; random access memory (RAM) devices 230; flash memory 232; and flash management program 300. In operation, flash management program 300 (or at least portions of it) is moved from the non-volatile storage of device 210 to volatile storage, such as RAM built into processor set 204.

System 102 may be a laptop computer, tablet computer, netbook computer, personal computer (PC), a desktop computer, a personal digital assistant (PDA), a smart phone, or any programmable electronic device capable of communicating with the client sub-systems via a network (not shown). Program 300 is a collection of machine readable instructions and/or data that is used to create, manage and control certain software functions that will be discussed in detail, below, in the Example Embodiment sub-section of this Detailed Description section.

System 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for system 102; and/or (ii) devices external to system 102 may be able to provide memory for system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In this embodiment, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
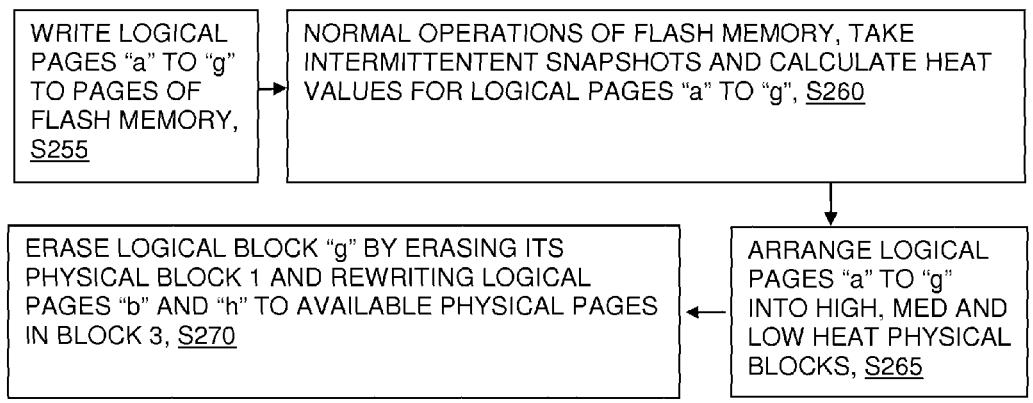
FIG. 2 is a flowchart showing a process performed, at least in part, by the first embodiment computer system.
Figure 3:
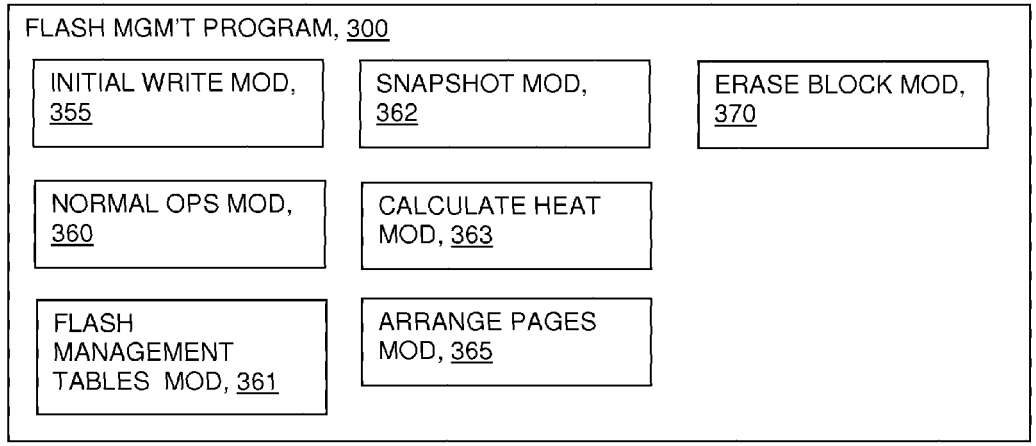
FIG. 3 is a schematic view of a portion of the first embodiment computer system.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where initial write module ("mod") 355 of flash management program 300 writes logical pages a to g to flash memory 232. In this simple example, there is only a single logical address for each page of data, and the write granularity of flash memory 232 is one page, meaning that each logical page can be rewritten to any arbitrary physical page of flash memory 232. To put it more simply, in this example, there is a one-to-one correspondence between logical address spaces (that is, pages) and physical address spaces (that is, pages), but, alternatively, other embodiments may store multiple logical address spaces (or portions thereof) in a single physical block.

Even though the simple example has only a single logical address for each page of data, this is not necessarily true in all embodiments of the present invention. There can be many logical addresses stored within a single physical page. Because the flash memory can restrict the granularity by which the page can be programmed, this will not necessarily align with the granularity that data is written by the application. Thus, this allows for the data of multiple logical addresses to be associated with a single physical page. Some flash memory devices allow for what are known as partial page programs. This allows pages to be programmed on a subpage granularity.

In this simple example, and as will be seen in some later Figures, flash memory 232 has four blocks (1 to 4) and each block has four pages in it. Collectively the physical page addresses of flash memory 232 in this example are A to P. This means that there are more physical pages present in flash memory 232 than what are written to with logical pages a to g.

Processing proceeds to step S260, where normal operations of the flash memory occur under control of normal operations mod 360. During these normal operations, snapshot mod 362 intermittently takes snapshots of the flash management tables in flash management tables mod 361. These snapshots include the data needed to determine how frequently each logical page a to g is accessed during normal operations of the computer. Through snapshotting the flash management tables, it can be determined if a particular logical address has been overwritten based on the associated physical address. Snapshots can show which logical addresses are frequently written based on the rate by which the corresponding physical addresses change.

Based on values in these snapshots, "heat values" are calculated for each logical address (in this example, each logical page). In this simple example, the heat value is an integer between 1 and 9, inclusive, with 9 being highest frequency of access and 1 being lowest frequency of access. The recalculation of heat values may be performed: (i) during snapshotting related events; (ii) during writing or rewriting of data; (iii) at both (i) and (ii); and/or (iv) any other times (whether at predetermined times, or based on predetermined conditions). The Further Comments And/Or Embodiments sub-section of this Detailed Description section has a more detailed discussion of ways of calculating heat value and the ways of scheduling these recalculations.

Processing proceeds to step S265, where arrange pages mod 365 arranges the logical pages a to g amongst the physical pages A to P of the four blocks (see FIG. 4) of flash memory 232. As shown in memory diagram 400 of FIG. 4: (i) the pages having relatively high heat values are grouped together in block 1 (specifically, pages A, B and C of block 1); (ii) the pages having mid-range heat values are grouped together in block 2 (specifically, pages E and F of block 2); and (iii) the pages having relatively low heat values are grouped together in block 4 (specifically, pages M, N and O of block 4). Alternatively, only some pages may be grouped by heat. For example, only pages of low heat may be rewritten to common physical blocks for reasons discussed below in the Further Comments And/Or Embodiments sub-section of this detailed Description section.

Processing proceeds to step S270, where erase block mod 370 erases block 1 in order to completely erase sensitive data of logical page g, which is no longer needed. However, the erase granularity in this example is at the block by block level (as is common in flash memories). This means that the other logical pages stored in block 1 must be moved to other locations. As shown in memory diagram 500 of FIG. 5, they are both moved to block 3, which had been empty prior the erasure of block 1 (see FIG. 4 at block 3). As an alternative, they could be moved back to block 1 after the erasure is complete, which would maintain block 1 as the block where high heat pages are grouped. As further discussed, below, in the Further Comments And/or Embodiments sub-section, the grouping of logical address spaces with similar heat values can help promote: (i) more even wear on the flash memory; and/or (ii) more efficient "garbage collection." The use case described above shows the value in an accurate and efficient process of determining heat levels.

III. Further Comments and/or Embodiments

Some embodiments of the present invention may include one, or more, of the following characteristics, features and/or advantages: (i) the "heat" (that is, overwriting frequency) of a portion of data is considered when controlling the writing of data in a flash memory storage device; (ii) the efficiency of the garbage collection process is increased; (iii) use flash management software to reduce the number of relocation writes and thereby improve "flash health;" (iv) use information knowledge regarding which data is cold in order to direct and improve the efficiency of the garbage collection process; (v) provide flash management software utilizing many different metadata structures in order to track the state of the physical flash blocks; (vi) control flash memory operation using information regarding which physical pages are in use, valid, and their logical to physical translation; (vii) take periodic snapshots of these flash management structures to provide insight into how the data is accessed; and/or (viii) use snapshots to assign heat values to logical addresses (and, by proxy, their underlying physical addresses) in order to improve garbage collection efficiency.

In some embodiments of the present invention, a snapshot of the flash management structures (or tables) is taken and stored in non-volatile memory. In these embodiments, these tables are used to accomplish flash management and are stored in a persistent manner. These tables are used to track the logical to physical translation, as well as the validity of the physical flash pages. Because these tables are persistent, the ability to generate a snapshot is inherently built into flash management. Extending this technique to be a periodic process allows the flash management to compare its current tables to that of the last snapshot. Through this compare, it can be determined which logical addresses have changed. Logical addresses that changed since the last snapshot will be considered "hotter" than those that did not change. This degree of heat for the logical address is reflected in respectively associated heat values (or heat level value). The heat level value is based on the frequency at which the associated logical address changes. More specifically, for each successive write to a given logical address, the physical address with which the logical address is associated with will change. The data may or may not change depending on the user application.

In some embodiments, each logical address has its own heat value. Alternatively, logical addresses could be binned, or clustered, with other logical addresses of similar heat. Knowing the heat of a given logical address will allow software to make an intelligent determination with regard to which physical address to associate with the given logical address.

In some embodiments, the garbage collection process physically groups logical addresses having relatively low heat values. Cold logical addresses will be grouped physically in flash memory. This can technically be done on different granularities: page, block, or erasure granularity unit. For flash memory devices, it is preferable to have data grouped within an erased block as much as feasible. One factor that the controlling software is written to consider is the imperative of increasing storage efficiency by physically grouping cold logical addresses.

Some embodiments also use heat values to effect control of flash memory operations so that cold logical addresses are placed in less healthy flash blocks, because these cold logical addresses are prospectively less likely to be overwritten based on past performance. Because these snapshots can be used to indicate host access patterns, this information can then in turn be used to direct hot logical addresses to more healthy physical addresses. More specifically, flash memory devices are designed to have a specified maximum number of program/erase cycles. A less healthy flash block can be considered a block that is approaching its specified maximum number of program/erase cycles. The health of a flash block can also be attributed to its susceptibility to bit errors and/or its ability to retain data.

Through the ongoing process of comparing snapshots, logical addresses can be assigned a heat value based on the rate by which its corresponding physical address changes. This heat value may be stored with the logical to physical mapping for ease of access. The heat values directly correspond to the likelihood that the given logical address will be overwritten in some period of time. In turn, this heat grade can be used in many different ways.

In one example, the heat can be used to direct future writes of logical addresses with similar heat. These writes may consist of a combination of host application writes, garbage collection writes, or any other write associated with flash management. Calculated heat values can be used to direct writes to logical addresses with higher heat values to the same group of physical blocks. Likewise, logical addresses with lower heat values can be written to the same group of physical blocks. In this example, the write initiator may not have knowledge of the heat values, and may be performing an independent, unrelated task associated with flash management.

At any point in time, logical addresses with similar heat may be distributed across different physical pages and blocks. Another method of heat grouping can be done through a process whose goal is to separate or group logical pages based on heat values. This independent process could act as a background process that would scan through the heat values obtained through snapshots of the logical to physical translation table. Based on the calculated heat values, this process would proactively group logical addresses of similar heat into the same group of physical blocks. This algorithm could be written in such a way that only logical addresses with a low heat value would be relocated to the same group of physical blocks with the assumption that logical addresses with high heat values are likely to be overwritten by the host or host application.

The use cases described above shows the value in an accurate and efficient process of determining heat levels.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Non-volatile random access memory ("NVRAM"): includes a wide range of memory mediums, such (without limitation) NAND flash memory, NOR flash memory, phase-change memory (PCM), magnetoresistive RAM (MRAM) and resistive RAM (RRAM).

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method for controlling operations of a flash memory, the method comprising:
    storing data in the flash memory with the data being arranged according to a set of logical addresses which are respectively stored at a set of physical addresses corresponding to a hardware layout of the flash memory;
    taking a plurality of successive snapshots of a flash memory metadata table for tracking accesses, by logical address, to the stored data;
    comparing each pair of successive snapshots of the plurality of successive snapshots to determine frequency of change value for each logical address of the flash memory metadata table;
    calculating a heat value for each logical address of the set of logical addresses corresponding to the relative frequency with which the corresponding logical address is accessed, based, at least in part, on the change values respectively corresponding to the logical addresses of the flash metadata table; and
    physically grouping, in the flash memory, data corresponding to logical addresses having a cold heat value.

2. The method of claim 1 further comprising:
    effecting control of flash memory operations so that cold logical addresses are placed in less healthy flash blocks.

3. The method of claim 2 further comprising:
    determining an identity of the logical addresses with cold heat values based, at least in part, upon which blocks have been most frequently erased during past operations.

4. The method of claim 1 wherein the physical grouping of data corresponding to logical addresses with cold heat values improves the efficiency of garbage collection by grouping logical addresses with cold heat values into blocks of physical addresses in the flash memory that have been erased during garbage collection.

5. A computer program product for controlling operations of a flash memory, the computer program product comprising a computer readable storage medium having program code embodied therewith, the program code executable by a computer to:
    store data in the flash memory with the data being arranged according to a set of logical addresses which are respectively stored at a set of physical addresses corresponding to a hardware layout of the flash memory;
    take a plurality of successive snapshots of a flash memory metadata table to track accesses, by logical address, to the stored data;
    compare each pair of successive snapshots of the plurality of successive snapshots to determine frequency of change value for each logical address of the flash memory metadata table;
    calculate a heat value for each logical address of the set of logical addresses corresponding to the relative frequency with which the corresponding logical address is accessed, based, at least in part, on the change values respectively corresponding to the logical addresses of the flash metadata table; and
    physically group, in the flash memory, data corresponding to logical addresses having a cold heat value.

6. The product of claim 5 wherein the program code is further executable by a computer to:

effect control of flash memory operations so that cold logical addresses are placed in less healthy flash blocks.

7. The product of claim 6 wherein the program code is further executable by a computer to:

determine an identity of logical addresses with cold heat values based, at least in part, upon blocks which have been most frequently erased during past operations.

8. The product of claim 5 wherein the physical grouping of data corresponding to logical addresses with cold heat values improves the efficiency of garbage collection by grouping logical addresses with cold heat values into blocks of physical addresses in the flash memory that have been erased during garbage collection.

9. A computer system for controlling operations of a flash memory, the computer system comprising:

a processor(s) set; and a program code storage device;

wherein:

the processor(s) set is structured, located, connected and/or programmed to run program code stored on the program code storage device; and the program code being executable by the processor(s) set to:

store data in the flash memory with the data being arranged according to a set of logical addresses which are respectively stored at a set of physical addresses corresponding to a hardware layout of the flash memory;

take a plurality of successive snapshots of a flash memory metadata table to track accesses, by logical address, to the stored data;

compare each pair of successive snapshots of the plurality of successive snapshots to determine frequency of change value for each logical address of the flash memory metadata table;

calculate a heat value for each logical address of the set of logical addresses corresponding to the relative frequency with which the corresponding logical address is accessed, based, at least in part, on the change values respectively corresponding to the logical addresses of the flash metadata table; and physically group, in the flash memory, data corresponding to logical addresses having a cold heat value.

10. The system of claim 9 wherein the program code is further executable by a computer to:

effect control of flash memory operations so that cold logical addresses are placed in less healthy flash blocks.

11. The system of claim 10 wherein the program code is further executable by a computer to:

determine an identity of logical addresses with cold heat values based, at least in part, upon blocks which have been most frequently erased during past operations.

12. The system of claim 9 wherein the physical grouping of data corresponding to logical addresses with cold heat values improves the efficiency of garbage collection by grouping logical addresses with cold heat values into blocks of physical addresses in the flash memory that have been erased during garbage collection.

* * * * *